(12) United States Patent
Robohm et al.

(10) Patent No.: US 8,417,632 B2
(45) Date of Patent: *Apr. 9, 2013

(54) SYSTEMS AND METHODS FOR INTERFACING WITH A BILLING AND ACCOUNT MANAGEMENT UNIT

(75) Inventors: Kurt W. Robohm, Leesburg, VA (US); Robert J. Frye, Reston, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 3012 days.

This patent is subject to a terminal disclaimer.

(21) Appl. No.: 10/097,870

(22) Filed: Mar. 15, 2002

(65) Prior Publication Data

US 2002/0138828 A1 Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
*G06Q 40/00* (2006.01)
(52) U.S. Cl. .................................................. 705/40
(58) Field of Classification Search .................. 705/40
See application file for complete search history.

(56) References Cited

U.S. PATENT DOCUMENTS

| | | | |
|---|---|---|---|
| 5,608,720 A | 3/1997 | Biegel et al. | |
| 5,758,343 A | 5/1998 | Vigil et al. | |
| 5,877,759 A | 3/1999 | Bauer | |
| 5,884,284 A * | 3/1999 | Peters et al. | 705/30 |
| 5,960,416 A | 9/1999 | Block | |
| 5,995,946 A | 11/1999 | Auzenne et al. | |
| 5,999,612 A | 12/1999 | Dunn et al. | |
| 6,008,805 A | 12/1999 | Land et al. | |
| 6,032,132 A | 2/2000 | Nelson | |
| 6,104,798 A * | 8/2000 | Lickiss et al. | 379/201.12 |
| 6,115,741 A | 9/2000 | Domenikos et al. | |
| 6,125,391 A | 9/2000 | Meltzer et al. | |
| 6,145,001 A | 11/2000 | Scholl et al. | |
| 6,154,743 A | 11/2000 | Leung et al. | |

(Continued)

FOREIGN PATENT DOCUMENTS

| | | |
|---|---|---|
| WO | 97/22209 | 6/1997 |
| WO | 98/53582 | 11/1998 |

OTHER PUBLICATIONS

W. Yeong et al., "Lightweight Directory Access Protocol", RFC 1777, Mar. 1995, pp. 1-16.
"Businessware Overview", www.vitria.com, pp. 1-2, print date Mar. 14, 2002.

(Continued)

*Primary Examiner* — James Trammell
*Assistant Examiner* — Daniel L Greene

(57) ABSTRACT

A system updates a billing unit. The system receives at least one modification to an Internet Protocol (IP) communications network account from a user and modifies a first record in a database based on the received at least one modification. The system transmits the at least one modification from the database to the billing unit and updates a second record, corresponding to the first record, in the billing unit based on the at least one modification so as to make the updated second record available in substantially real time.

30 Claims, 29 Drawing Sheets

U.S. PATENT DOCUMENTS

| | | |
|---|---|---|
| 6,175,656 B1 | 1/2001 | Hoang |
| 6,189,033 B1 | 2/2001 | Jin et al. |
| 6,192,405 B1 | 2/2001 | Bunnell |
| 6,192,418 B1 | 2/2001 | Hale et al. |
| 6,195,697 B1 | 2/2001 | Bowman-Amuah |
| 6,208,986 B1 | 3/2001 | Schneck et al. |
| 6,282,281 B1 | 8/2001 | Low |
| 6,330,560 B1 | 12/2001 | Harrison et al. |
| 6,353,660 B1 * | 3/2002 | Burger et al. .............. 379/88.17 |
| 6,418,324 B1 | 7/2002 | Doviak et al. |
| 2001/0032076 A1 | 10/2001 | Kursh |
| 2001/0037379 A1 | 11/2001 | Livnat |
| 2001/0037469 A1 | 11/2001 | Gupta et al. |
| 2001/0049745 A1 | 12/2001 | Schoeffler |
| 2002/0023232 A1 | 2/2002 | Serani et al. |

OTHER PUBLICATIONS

"Netegrity SiteMinder 4.6", www.netearity.com, p. 1, print date Mar. 14, 2002.

"The iPlanet Web Server Keeps Data Safe", www.iplanet.com, p. 1, print date Mar. 14, 2002.

"Infranet", www.portal.com/products/infranet/infranet.html, pp. 1-4, print date Mar. 14, 2002.

"Netscape ECXpert Data Sheet", Netscape.com, copyright 2000, pp. 1-5.

Putman, Janis, "Distribution Transparencies for Integrated System", MITRE Corp., Feb. 2000, pp. 1-18.

* cited by examiner

FIG. 13

Create New Master Customer Account — 1310

Customer Name: |UNITEL|

[CREATE NEW MASTER ACCOUNT] — 1330

Create New Customer Sub-Account — 1320

Select Customer Master Account:
|None ▼|

Select Account to which New Sub-Account can be added:
|Select Customer Accounts/Range ▼|

[BACK]   [CREATE]

Create Customer Account

| Field | Value |
|---|---|
| Customer Name | UNITEL |
| Legacy Account Number | 567891011 |
| Account Name | East Region * |
| Contact Name (First, Last) | Mr. ▼ John * Doe * |
| Contact Title | CIO |
| Address | 1111 Pine Dr * |
| City | Wayne |
| State | NEW JERSEY ▼ Zip Code 12345 * Country USA ▼ |
| Email | jdoe@unitel.com * |
| Primary Phone | 555-555-5555 * (###-###-#####) Secondary Phone (###-###-#####) |
| Contact Fax | 444-555-4444 (###-###-#####) |
| Customer Abbreviation | UNI |
| Customer Type | XXX ▼ * |
| NASP ID | 2344 |
| MEGA ID | 12345678910 * |
| Corp ID | 3232 * |
| Service ID | 4345 * |

Create New Master Customer Account ~1310

Customer Name:

CREATE NEW MASTER ACCOUNT

Create New Customer Sub-Account ~1320

Select Customer Master Account:
|UNITEL/567891011    ▼| ~1510

Select Account to which New Sub-Account can be added:
|East Region/567891011 (Active) ▼| ~1520

BACK    CREATE   ~1530

1300

Create Customer Account

| Field | Value |
|---|---|
| Customer Name | UNITEL * |
| Legacy Account Number | 1234556 |
| Account Name | South East * |
| Contact Name (First, Last) | Mr. ▾ John  * Doe * |
| Contact Title | CIO |
| Address | 1111 Pine Dr |
| City | Wayne * |
| State | NEW JERSEY ▾  Zip Code 12345  *Country USA ▾ |
| Email | jdoe@unitel.com * |
| Primary Phone | 555-555-5555 * (### - ### - ####) Secondary Phone ____ (### - ### - ####) |
| Contact Fax | 444-555-4444 (### - ### - ####) |
| Customer Abbreviation | UNI * |
| Customer Type | XXX ▾ * |
| NASP ID | 2323 |
| MEGA ID | 98766544322 |
| Corp ID | 434455 |
| Service ID | 45533 |

1600

Create ipcom Order

Service Information
- Service Location: Medford *
- Service Name: EastIpCom *

Contact Information
- Order Contact Name: Nate Lyall *
- Phone Number: 555-555-5555 *
  (####-####-####)
- Address: 1211 Lake View Dr
- City: Medford *
- State: NEW JERSEY *
- Zip Code: 43236 *
- E-mail Address: nlyall50@unitel.com *

Account Team Information
- Account Team Name: Communications *
- Phone Number: 555-544-5454 *
  (####-####-####)
- Email: nlyall50@unitel.com

Feature Information
- Feature Type: DialPlan
- Feature Name:

To add a feature to the list, choose the feature type, enter a name and click ADD DialPlan - Jersey IPCom - New To remove a feature from the list, select the feature and click REMOVE

[PRINT] [CANCEL] [RESET]   [BACK] [NEXT] ~ 1910

1900

Service Management

Manage Services

Select Account Hierarchy:
*Customer Name: Account Name / Number (Status)*
[ABC: ABC / 999999999 (ACTIVE) ▼] ~2010

Select Customer Accounts/Range:
*Account Name / Number (Status)*
[EAST COAST / 2244246 (ACTIVE) ▼] ~2020

Select Customer Service Number:
*Service - Location*
[IPCOM - FAIRFAX ▼] ~2030

PRINT  SAVE  CANCEL  RESET  BACK  NEXT

View Current Charges

Customer Number  1234567890
Customer Name    JOE SMITH

Summary of Current Charges ~2310

| Date | Description | One-Time Charge/Credit | Recurring Charge/Credit | Usage Charge/Credit | Charge/Minute | Total Charges |
|---|---|---|---|---|---|---|
| | Long Distance Session Charges ~2330 | | | 1156290338 | .11 | 11,562,934.10 |

Total Current Charges ~2320
Select a Past Invoice

[PRINT] [SAVE] [CANCEL] [RESET] [BACK] [NEXT]

Current Long Distance Charges

Customer Number 1234567890
Customer Name JOE SMITH

Summary of Current Long Distance Charges

| Date & Time* | To | Duration (mins) | Charge/Minute | Total Charges |
|---|---|---|---|---|
| Aug 2, 2000 4:40 PM | 5555555555 | 28901 | .10 | 2,890.10 |
| Aug 22, 2000 4:40 PM | 1234567890 | 1 | .25 | 0.25 |
| Aug 22, 2000 4:40 PM | 5555555555 | 1 | .10 | 0.10 |
| Jan 1, 1970 12:00 AM | 5555555555 | 16116041 | .10 | 1,611,604.10 |
| Jan 25, 1906 11:15 AM | 5555555555 | 49742245 | .10 | 4,974,224.50 |
| Jan 25, 1906 11:15 AM | 1234567890 | 49742245 | .10 | 4,974,224.50 |
| Aug 22, 2000 4:40 PM | 5555555555 | 1 | .25 | 0.25 |
| Nov 1, 2000 10:30 PM | 5555555555 | 2 | .10 | 0.20 |
| Aug 2, 2000 4:40 PM | 5555555555 | 1 | .10 | 0.10 |

Total Current Long Distance Charges 11,562,934.10

*Date and Time are reported in GMT

PRINT  SAVE  CANCEL  RESET  BACK  NEXT

Select Past Invoice

To view a past Invoice, select an Invoice Range (mm/dd/yyyy):

[    ] TO [    ] DISPLAY RANGE

Please select from your past invoices listed below then press Next.

| | Billing Number | Invoice Start Date | Invoice End Date |
|---|---|---|---|
| ○ | 1111111111 | 01/01/1970 | 02/01/1970 |

PRINT  SAVE  CANCEL  RESET  BACK  NEXT

Here is your Past Invoice

Billing Period:
Apr 12, 2001
Jan 1, 1970

JOE SMITH
1234 WEST FIRST STREET
ANYTOWN, VA 22030
CUSTOMER NUMBER 1234567890

Invoice Number:

Summary of Amount Due

| Description | One-Time Charge/Credit | Recurring Charge/Credit | Usage Charge/Credit | Charge/Minute | Total Charges |
|---|---|---|---|---|---|
| Long Distance Session Charges | | | 116629338 | .11 | 11,562,934.10 |
| Total Current Charges | | | | | 0.00 |
| Total Subordinate Account Charges | | | | | 0.00 |
| Total Previous Charges | | | | | 0.00 |
| Total Due | | | | | 0.00 |

[PRINT]  [SAVE]  [CANCEL]  [RESET]          [BACK]  [NEXT]

2700

2710

SYSTEMS AND METHODS FOR INTERFACING WITH A BILLING AND ACCOUNT MANAGEMENT UNIT

RELATED APPLICATION

This application claims priority under 35 U.S.C. §119(e) based on U.S. Provisional Application Ser. Nos. 60/276,923, 60/276,953, 60/276,954, and 60/276,955, all filed Mar. 20, 2001, the disclosures of which are incorporated herein by reference.

FIELD OF THE INVENTION

The present invention relates generally to communications systems and, more particularly, to an operational support system that allows for communication service attributes to be updated in an account management and billing unit in substantially real time.

BACKGROUND OF THE INVENTION

Telecommunications service providers continually increase the number of services and products they offer to customers. A recent trend, for example, is a desire to offer broadband, wireless, and Internet services. As competition increases, service providers must provide an increased level of support for these advanced data services while keeping costs down.

Service providers also desire the ability to allow users (e.g., system administrators, engineers, and customers) to modify attributes associated with these advanced data services and to implement these modifications in substantially real time. By way of example, an attribute may relate to how Voice over Internet Protocol (VoIP) calls are routed to and from a customer. Conventionally, changes to telecommunication services required human intervention and could take days or weeks before the changes took effect. It is important that when these changes are eventually implemented, the service providers' billing systems be updated to reflect the changes to ensure that customers are billed correctly.

Accordingly, there is a need in the art for a system and method that allow users to modify service attributes associated with an IP communications network such that the modifications are available in substantially real time and that billing systems reflect the current service attributes.

SUMMARY OF THE INVENTION

Systems consistent with the principles of this invention address this and other needs by providing systems and methods that allow users to make changes to telecommunication services in substantially real time.

In an implementation consistent with the present invention, a method for updating a billing unit is disclosed. The method includes receiving at least one modification to an IP communications network account from a user, modifying a first record in a database based on the received at least one modification, transmitting the at least one modification from the database to the billing unit, and updating a second record, corresponding to the first record, in the billing unit based on the at least one modification. The updated second record is available in substantially real time.

In another implementation consistent with the present invention, a method for performing account management and billing is disclosed. The method includes providing a web-based interface to a user, where the web-based interface allows the user to view and manage at least one account associated with the IP communications network; receiving a modification to the at least one account from the user; updating a first record associated with the account in an operational data store based on the received modification; transferring the modification from the operational data store to an account management and billing unit associated with the IP communications network; modifying a second record associated with the account at the account management and billing unit, such that the modification to the second record is implemented in substantially real time; and performing one of an account management function and a billing function using the modified second record.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 12-27 illustrate exemplary screens that may be provided to the user by the network interface in an implementation consistent with the present invention.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide an operational support system that allows users to modify services offered by the operational support system via a web-based interface. A billing and account management unit is updated based on the modifications made by the user in substantially real time.

Exemplary System

Figure 1:
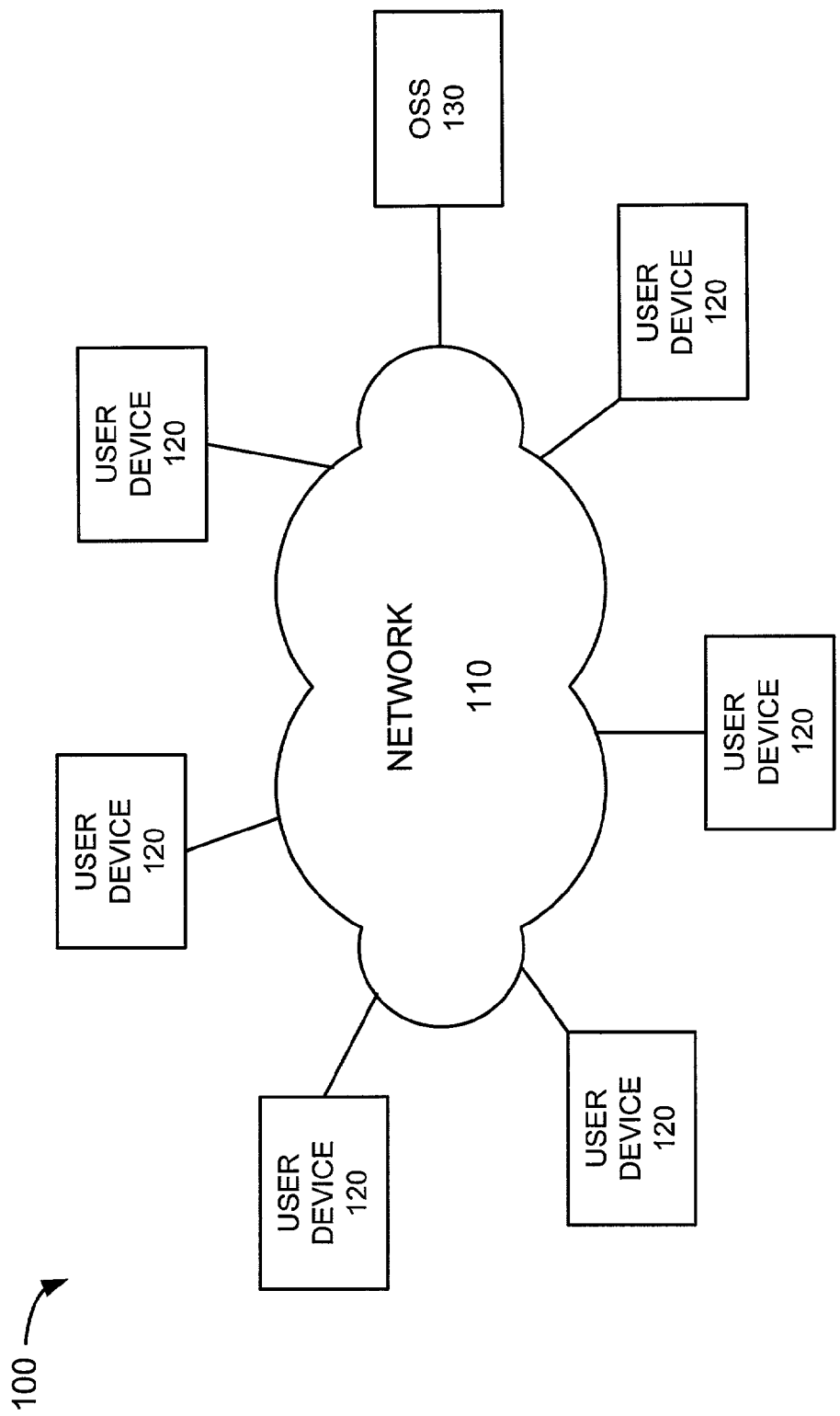
FIG. 1 illustrates an exemplary system in which systems and methods, consistent with the present invention, may be implemented.

FIG. 1 illustrates an exemplary system 100 in which systems and methods, consistent with the present invention, may be implemented. In FIG. 1, system 100 includes a network 110 that interconnects a group of user devices 120 and an operational support system (OSS) 130. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), a public switched telephone network (PSTN), and/or some other similar type of network. In fact, the network 110 may include any type of network or combination of networks that permits routing of information from a particular source to a particular destination.

The user devices 120 may include a type of computer system, such as a mainframe, minicomputer, or personal computer, a type of telephone system, such as a POTS telephone or a session initiation protocol (SIP) telephone, and/or some other similar type of device that is capable of transmitting and receiving information to/from the network 110. The user device 120 may connect to the network via any conventional technique, such as a wired, wireless, or optical connection.

Figure 2:
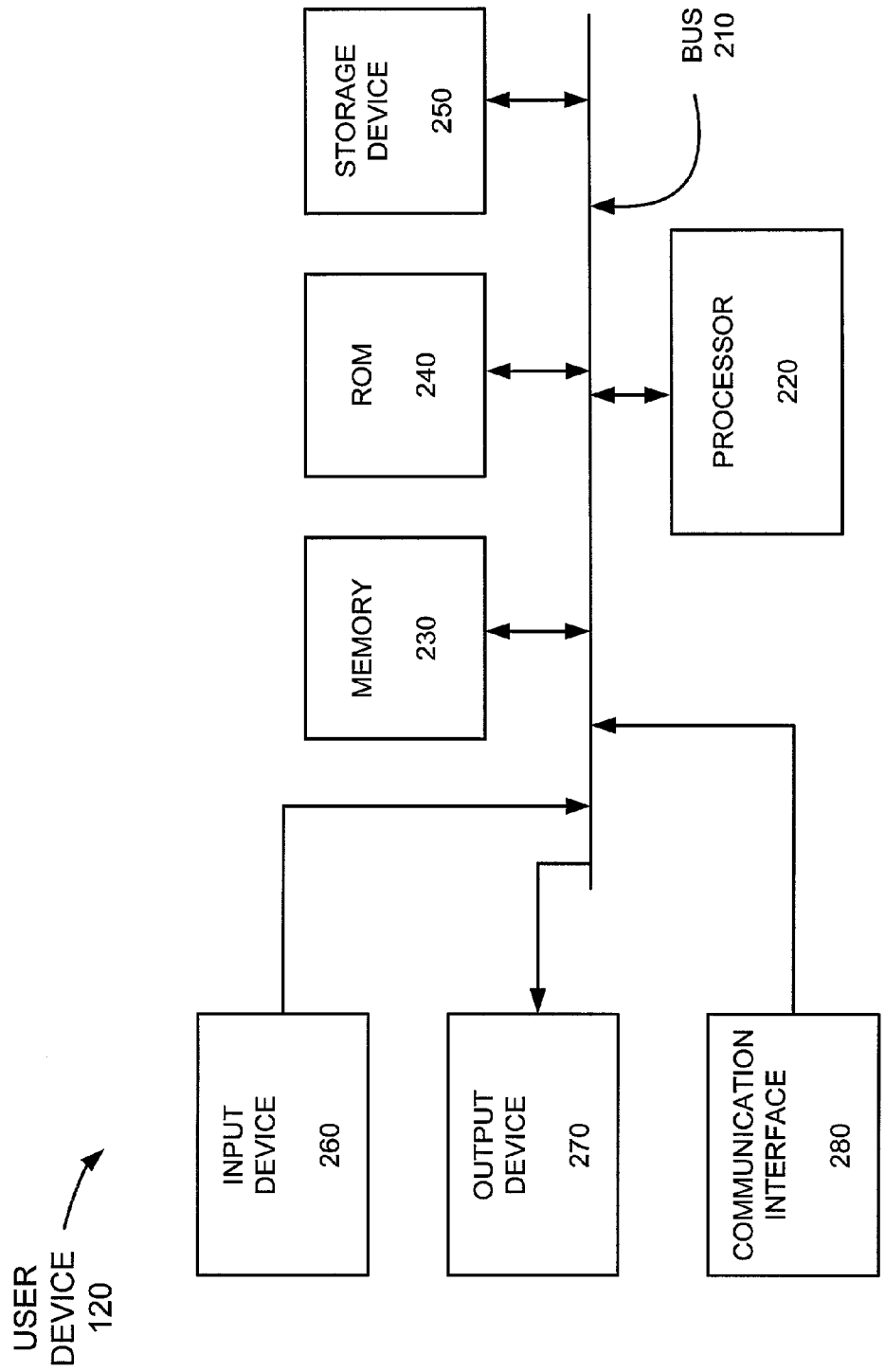
FIG. 2 illustrates an exemplary configuration of a user device of FIG. 1 in an implementation consistent with the present invention.

FIG. 2 illustrates an exemplary configuration of a user device 120 of FIG. 1 in an implementation consistent with the present invention. In FIG. 2, the user device 120 includes a bus 210, a processor 220, a memory 230, a read only memory (ROM) 240, a storage device 250, an input device 260, an output device 270, and a communication interface 280. The bus 210 may include one or more conventional buses that permit communication among the components of the user device 120.

The processor 220 may include any type of conventional processor or microprocessor that interprets and executes instructions. In one implementation consistent with the present invention, the processor 220 executes the instructions to cause a web browser to be displayed to an operator of the user device 120. As will be described in more detail below, the operator may access and modify attributes associated with the services provided by the OSS 130 via this web browser.

The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism or combination of mechanisms that permits an operator to input information to the user device 120, such as a keyboard, a mouse, a microphone, a pen, a biometric input device, such as voice recognition device, etc. The output device 270 may include any conventional mechanism or combination of mechanisms that outputs information to the operator, including a display, a printer, a speaker, etc.

The communication interface 280 may include any transceiver-like mechanism that enables the user device 120 to communicate with other devices and/or systems, such as OSS 130. For example, the communication interface 280 may include a modem or an Ethernet interface to a network.

Returning to FIG. 1, the OSS 130 provides the infrastructure for integrating data from traditional telephony services and applications with advanced data application platforms. Through OSS 130, customers, using, for example, user device 120, may manage, configure, and provision traditional telephony and advanced data services in real time, obtain real time billing information, and generate reports using a rules-centric middleware core. In one embodiment, a customer may perform these functions through a single point of entry using an Internet accessible web interface.

Figure 3:
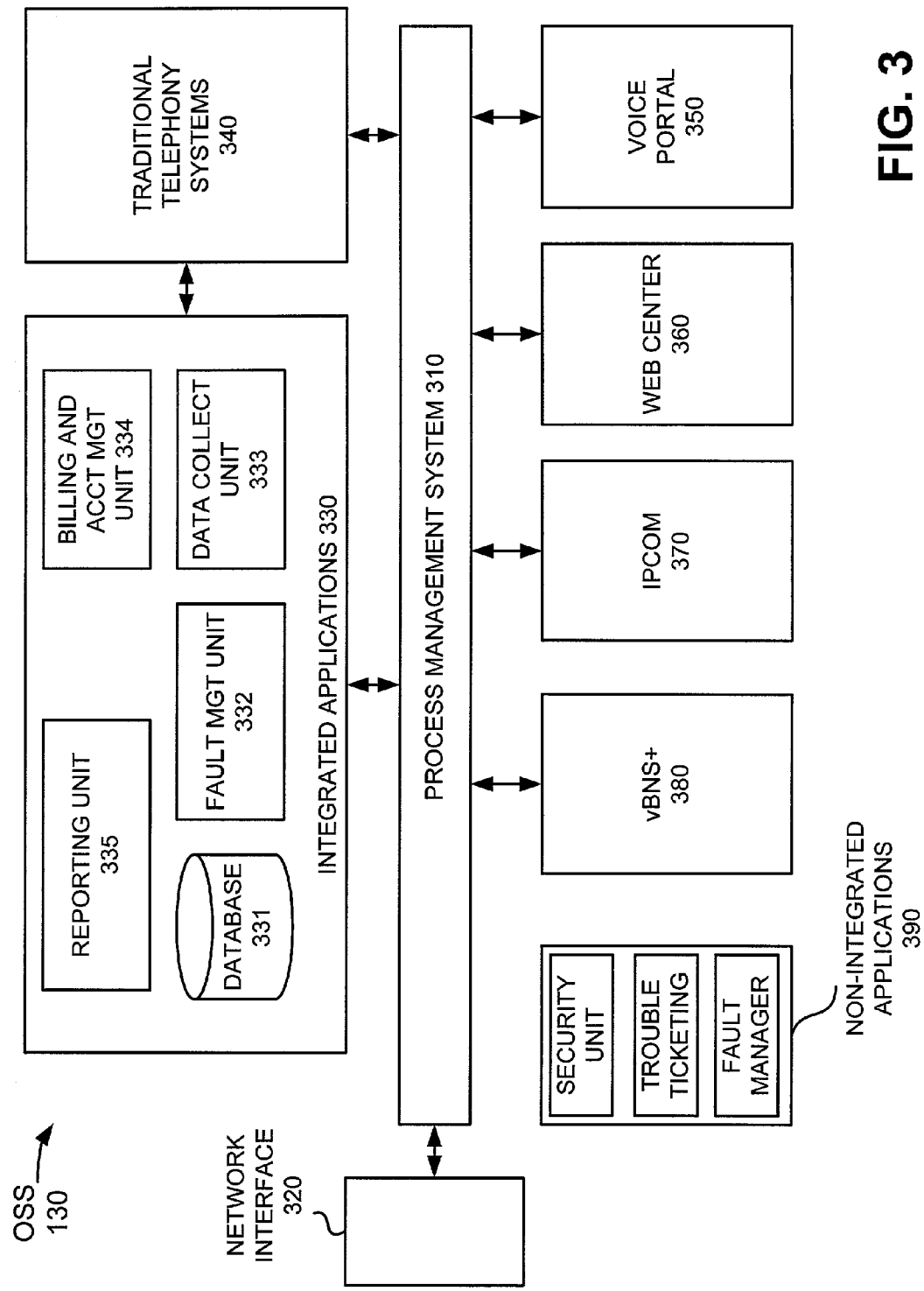
FIG. 3 illustrates an exemplary configuration of the operational support system of FIG. 1 in an implementation consistent with the present invention.

FIG. 3 illustrates an exemplary configuration of the OSS 130 of FIG. 1 in an implementation consistent with the present invention. As illustrated, the OSS 130 includes a process management system 310, a network interface 320, a group of integrated applications 330, a group of traditional telephony systems 340, a voice portal unit 350, a web center unit 360, an IPCOM unit 370, a very high performance backbone network service (vBNS+) unit 380, and a group of non-integrated applications 390. It will be appreciated that the OSS 130 may include other components (not shown) that aid in receiving, processing, and/or transmission of data.

The process management system 310 acts as the backbone to the OSS 130 by providing graphical process automation, data transformation, event management, and flexible connectors for interfacing with OSS components. In one implementation consistent with the present invention, the process management system 310 uses a Common Object Request Broker Architecture (CORBA) based publish-and-subscribe messaging middleware to integrate the different components of the OSS 130. Other techniques for integrating the different components of the OSS 130 may alternatively be used, such as eXtensible Markup Language (XML) or Enterprise JavaBeans (EJB). The process management system 310 may, for example, be implemented using Vitria Technology Inc.'s BusinessWare software system.

The network interface 320 provides a graphical user interface that allows users (e.g., customers, engineers, account teams, and the like) to access the components of the OSS 130. The network interface 320 may include commercial off the shelf (COTS) software or hardware packages, such as Siteminder® by Netegrity, Inc. and/or iPlanet™ by Sun Microsystems, Inc., custom software or hardware, or a combination of custom software/hardware and COTS software/hardware.

Via the network interface 320, customers may, for example, request that service be connected or disconnected, monitor or change network or user settings, obtain reports, and perform e-billing, account management, and trouble reporting and tracking functions in a real time manner. The network interface 320 may, for example, allow engineers to submit transactions to control and configure network elements and services in a real time manner. The network interface 320 may, for example, allow account teams to manage account creations and cancellations, generate sub-accounts from master accounts, access current account data, and access historical account data. As will be described in additional detail below, the network interface 320 allows for account management and billing functions to be performed remotely, such as over the Internet, via a user device 120.

The network interface 320 authenticates users and controls actions that authenticated users are allowed to execute in the OSS 130. In one implementation consistent with the present invention, the network interface 320 allows users access to the components of the OSS 130 via a single sign-on technique. This single sign-on eliminates the need for users to sign in (or authenticate themselves) in order to access different components of the OSS 130. Once authenticated, users may access those components of the OSS 130 to which they have been provided authorization.

The integrated applications 330 may include, for example, a database 331, a fault management unit 332, a data collection unit 333, a billing and account management unit 334, and a reporting unit 335. The database 331 may include one or more separate databases for storing data. In one implementation, the database 331 includes a data warehouse, an operational data store, and a lightweight directory access protocol (LDAP) directory server. The data warehouse acts as a repository for service order, account, usage, and performance data. In one implementation, the data warehouse may be implemented as a relational database management system (RDBMS) based system.

The operational data store (ODS) acts as the repository of data that reflects the most recent version of service and engineering attributes/parameters that should be acted upon in the network itself. The operational data store also stores authentication and authorization data. This data defines user's roles and privileges. Like the data warehouse, the operational data store may be a RDBMS based system.

The LDAP directory server stores similar information to that described above with respect to the operational data store, however, the LDAP directory server stores entries in a hierarchical, tree-like structure. As a result, the LDAP directory server provides a quick response to high volume lookup and/or search operations. Additional information regarding LDAP can be found in W. Yeong et al., "Lightweight Directory Access Protocol," RFC 1777, March 1995, which is incorporated by reference herein.

The fault management unit 332 monitors and manages the overall operation of the OSS 130. The fault management unit 332 receives information from every device, computer and application in the OSS 130 via the process management system 310 and, in situations where a fault has been detected, may transmit trouble tickets identifying the fault to the appropriate system administrator.

The data collection unit 333 collects customer usage and performance data for the devices supported by the OSS 130, transforms the data, if necessary, and passes the data on to the appropriate device, such as the billing and account management unit 334, the database 331, etc. In one implementation, the data collection unit 333 utilizes a hierarchical architecture, having a centralized manager that defines and manages collection and data transformation schemas. Individual, lower level gatherers interface with source targets.

The billing and account management unit 334 receives customer usage and performance data from the data collection unit 333 and generates bills in a well-known manner based thereon. The billing and account management unit 334 may be configured with a variety of rating rules and plans and may provide mechanisms to manage and create rating plans, as well as mechanisms for building revenue reports and generating billing reports. The rating rules may be customized based on a particular customer's requirements or generalized. The rating rules may include traditional telephony styled rating rules that include time-of-day, day-of-week, distance-based, flat rate, non-recurring, and recurring on a definably regular basis, such as weekly, bi-weekly, monthly, etc., ratings. In an exemplary implementation of the present invention, the billing and account management unit 334 may also provide bonus points, airline miles, and other incentive items as part of the rules-based rating and billing service.

Billing and account management unit 334 may provide revenue and billing reports to authorized parties. Billing and account management unit 334 may allow customers to access previous invoices and view current charges not yet billed. In an exemplary implementation consistent with the present invention, billing and account management unit 334 may transfer rated events and summary records into other billing and revenue systems. For example, billing and account management unit 334 may receive and transfer billing information or event information to a legacy billing system (i.e., an existing billing system) that generates the actual bill. In alternative implementations, billing and account management unit 334 may provide hard copy bills and/or provide electronic bills to a customer. In this implementation, billing and account management unit 334 may be configured to perform electronic payment handling.

The billing and account management unit 334 also stores customer account information and allows users to access this information via the network interface 320. As customer orders and accounts are created or modified through normal business functions, the OSS 130 keeps the billing and account management unit 334 up to date in a real time manner via the process management system 310. Authorized parties may also extract real time data from the billing and account management unit 334. While the billing and account management unit 334 is illustrated as a single unit in FIG. 3, in other implementations consistent with the present invention, the OSS 130 may include separate billing and account management units.

The reporting unit 335 may interact with various components of the OSS 130, such as the database 331 and billing and account management unit 334, to provide users (i.e., customers, engineers, and accountants) with the ability to obtain reports based on real time data. The reports may include, for example, billing reports, reports regarding the usage and/or performance of the network, etc.

The traditional telephony systems 340 may include one or more components that are typically used in a telecommunications network. In one implementation, the traditional telephony systems 340 include one or more legacy systems, such as an order entry system, provisioning system, billing system, and the like.

The voice portal unit 350 provides a variety of information services to subscribers. These services may include, for example, banking, brokerage, and financial services, travel and entertainment services, distribution and shipping services, insurance services, health and pharmaceutical services, manufacturing services, and the like. The voice portal unit 350 may store subscriber profiles to determine a subscriber's device preference (e.g., a cellular telephone, a personal digital assistant, a paging device, and the like) and may also track a subscriber's access to the services for billing purposes.

The web center 360 acts as a virtual call center by queuing, routing, and distributing communications from any first location to an appropriate agent at any second location. The web center 360 allows agents to handle multiple mediums (e.g., inbound telephone calls, faxes, e-mails, voicemail, VoIP transactions, etc.) via a single browser-based interface.

The IPCOM unit 370 may include one or more devices that provide VoIP services to subscribers. The subscribers may make and receive calls via an IP communications network using, for example, session initiation protocol (SIP) telephones. It will be appreciated that the IP communications service is not restricted to using SIP phones, however. It may also include the capability to establish IP-based inter-machine trunks between PBXs, replacing legacy telephony trunk interfaces like T1's and the like. Call routing over these IP communication trunks may traverse the IP communications network, but be terminated on both sides to a PBX. Sophisticated subscribers services, such as call forwarding, may be implemented on top of the trunking scenario.

The IPCOM unit 370 may support the following exemplary services: follow me, call blocking, call forwarding, voice mail, conference calling, single line extension, call screening, quality of service, class of service, dial-plan restrictions, dynamic registration, secondary directory number, and call transfer. As described above, customers may set or change attributes associated with these features via the network interface 320.

The vBNS+ unit 380 provides the IP infrastructure for the IP communications network. The vBNS+ unit 380 may include a group of routers that route packets in the network. The non-integrated applications 390 may include, for example, a security unit, a trouble ticketing unit, and a fault manager. The security unit may include one or more firewalls for securing the network interface 320, telephone equipment (e.g., PBX, switch, and redirect server), and network operations. The trouble ticketing unit manages the issuance and resolution of trouble tickets. The fault manager monitors the hardware components of the OSS 130.

Figure 4:
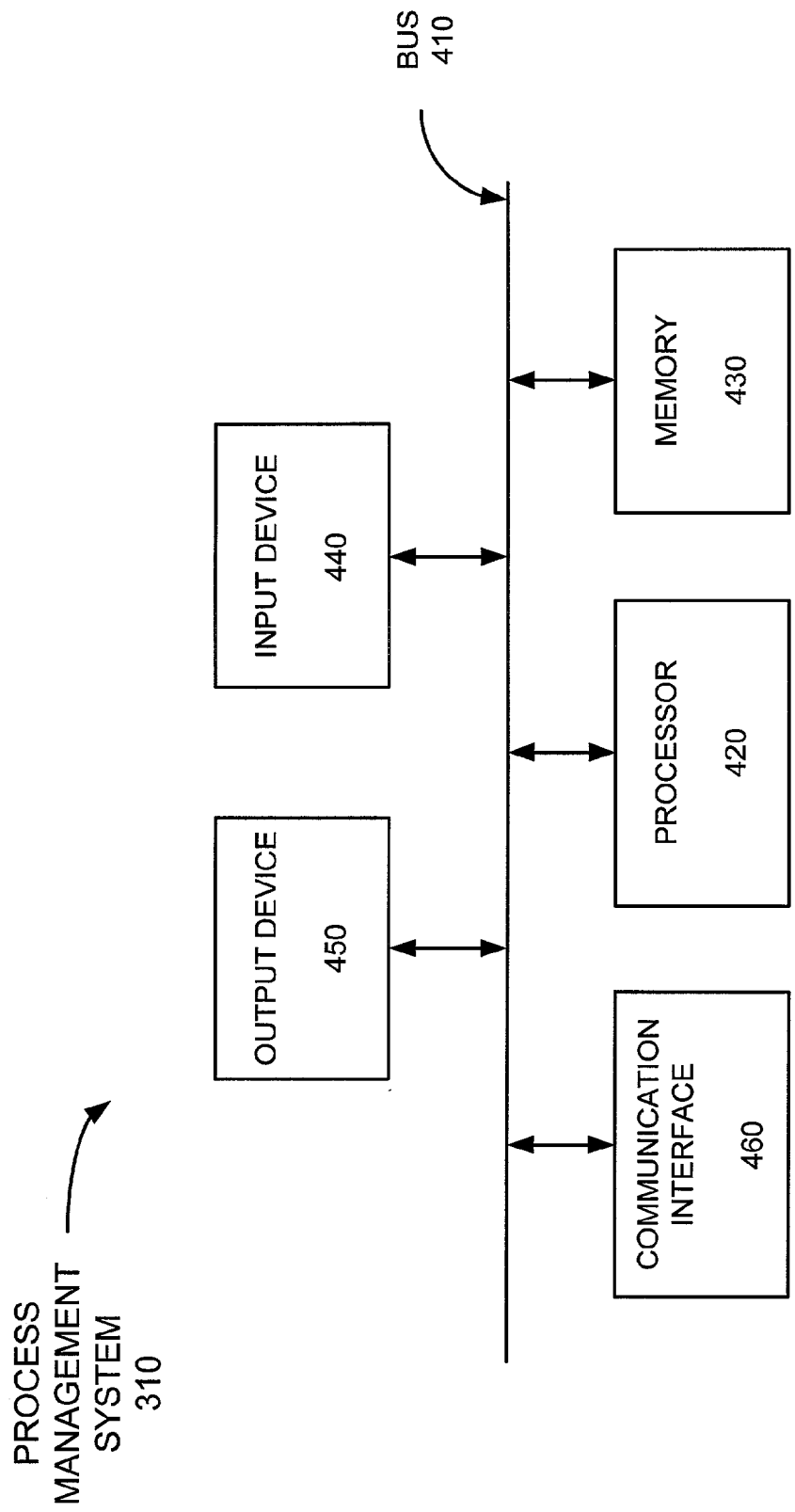
FIG. 4 illustrates an exemplary configuration of the process management system of FIG. 3 in an implementation consistent with the present invention.

FIG. 4 illustrates an exemplary configuration of the process management system 310 of FIG. 3 in an implementation consistent with the present invention. As illustrated, the process management system 310 includes a bus 410, a processor 420, a memory 430, an input device 440, an output device 450, and a communication interface 460. The bus 410 permits communication among the components of the process management system 310.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some type of magnetic or optical recording medium and its corresponding drive.

The input device 440 may include any conventional mechanism or combination of mechanisms that permits an operator to input information to the process management system 310, such as a keyboard, a mouse, a pen, a biometric mechanism, and the like. The output device 450 may include any conventional mechanism or combination of mechanisms that outputs information to the operator, including a display, a printer, a speaker, etc. The communication interface 460 may include any transceiver-like mechanism that enables the process management system 310 to communicate with other devices and/or systems, such as the network interface 320, integrated applications 330, traditional telephony systems 340, etc. via a wired, wireless, or optical connection.

Execution of the sequences of instructions contained in a computer-readable medium, such as memory 430, causes processor 420 to implement the functional operations described below. In alternative embodiments, hardwired circuitry may be used in place of or in combination with software instructions to implement the present invention. Thus, the present invention is not limited to any specific combination of hardware circuitry and software.

Figure 5:
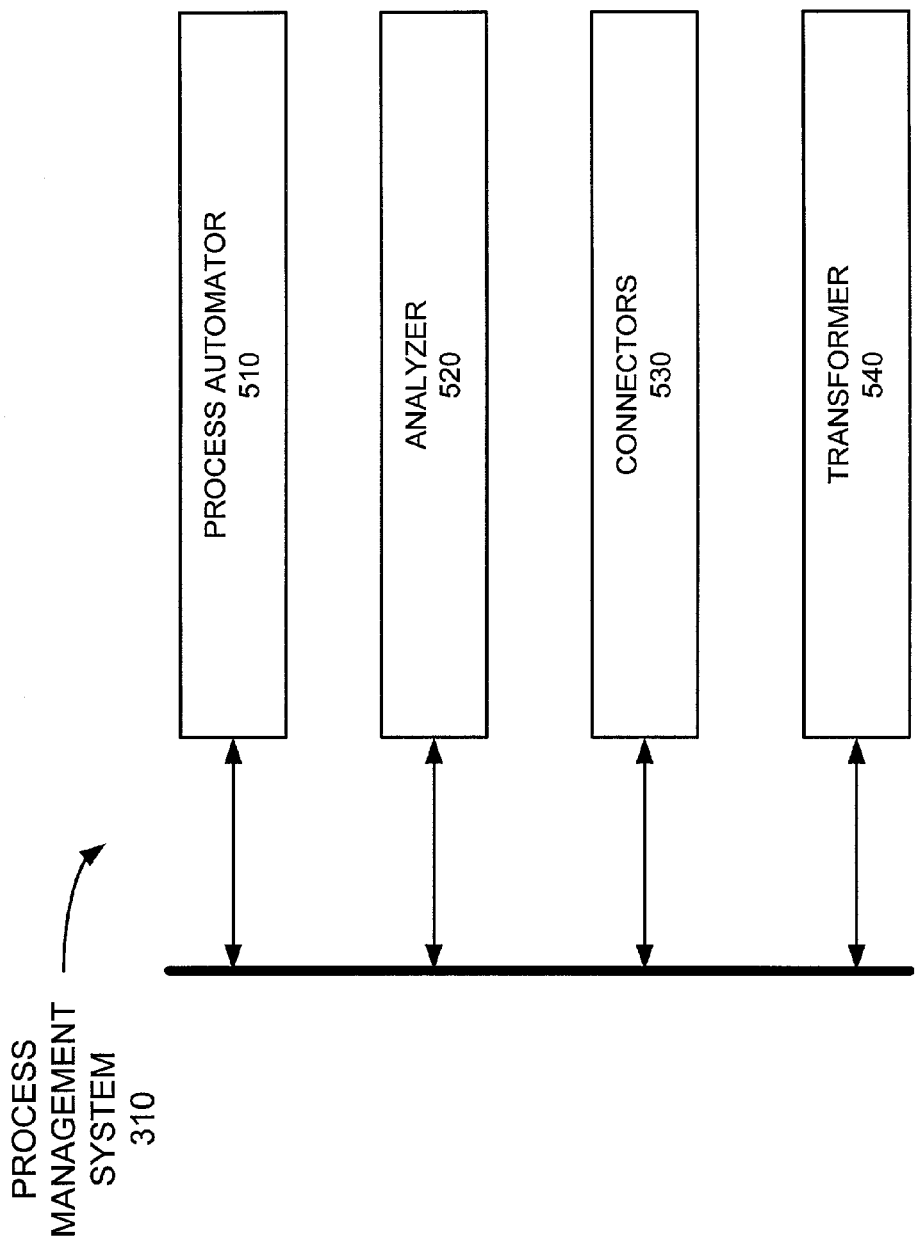
FIG. 5 illustrates an exemplary functional block diagram of the process management system of FIG. 3 in an implementation consistent with the present invention.

FIG. 5 illustrates an exemplary functional block diagram of the process management system 310 of FIG. 3 in an implementation consistent with the present invention. As illustrated, the process management system 310 includes a process automator 510, an analyzer 520, a group of connectors 530, and a transformer 540. It will be appreciated that the process management system 310 may include additional functional elements (not shown) that aid in the reception, processing, and/or transmission of data.

The processor automator 510 includes a modeling tool that allows event processing to be visually modeled by engineers and product development analysts. The process automator 510 can then execute these models to create an automated business process. The analyzer 520 provides on-going and real time monitoring of the components of the OSS 130. The analyzer 520 delivers reports, history, and trending on events processed through the process management system 310.

The connectors 530 include a group of customized rules that allows the components of the OSS 130 to interact and communicate with the process management system 310. A unique connector 530 may be established for each component in the OSS 130. As new components are added to the OSS 130, new connectors 530 are established to allow the new components to communicate with the existing components of the OSS 130. Once the connectors 530 have been established, the OSS components may communicate with the process management system 310 via standard messaging or through full publish/subscribe processing. The transformer 540 inspects data received by the connectors 530. The transformer 540 may also transform the data received by the connectors 530, if necessary, prior to the data being transferred on to its destination.

Figure 6:
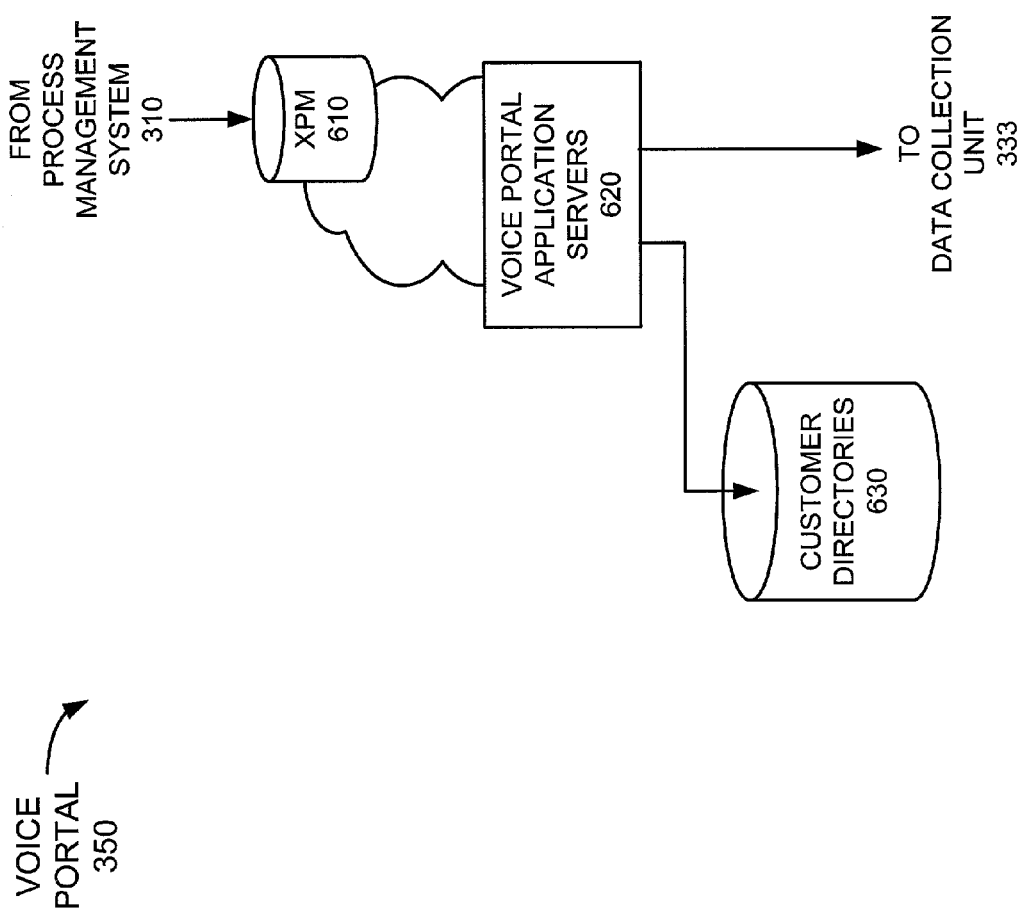
FIG. 6 illustrates an exemplary configuration of the voice portal unit of FIG. 3 in an implementation consistent with the present invention.

FIG. 6 illustrates an exemplary configuration of the voice portal unit 350 of FIG. 3 in an implementation consistent with the present invention. As illustrated, the voice portal unit 350 includes an eXtensible Program Management (XPM) unit 610, one or more voice portal application servers 620, and a customer directory database 630. The XPM unit 610 receives user profile information from the network interface 320 via the process management system 310 and stores this information for use by the voice portal application servers 620. The XPM unit 610 may also receive other information, such as information identifying the device(s) (e.g., personal digital assistant, cellular telephone, pager, etc.) by which the customer wishes to receive the service(s) provided.

The voice portal application servers 620 may include one or more servers that interact with the XPM unit 610 to provide, for example, banking, brokerage, and financial services, travel and entertainment services, distribution and shipping services, insurance services, health and pharmaceutical services, manufacturing services, and the like. Voice portal application servers 620 may also provide data collection unit 333 with information regarding what services are accessed and by whom. The data collection unit 333 may then pass this information on to the billing and account management unit 334 for billing purposes. The voice portal application servers 620 may be located at the OSS 130 or distributed throughout the network 110. The customer directories 630 may store information relating to the services provided by the voice portal application servers 620. For example, the customer directories 630 may store stock quotes, current weather forecasts, real time sports scores, etc.

Figure 7:
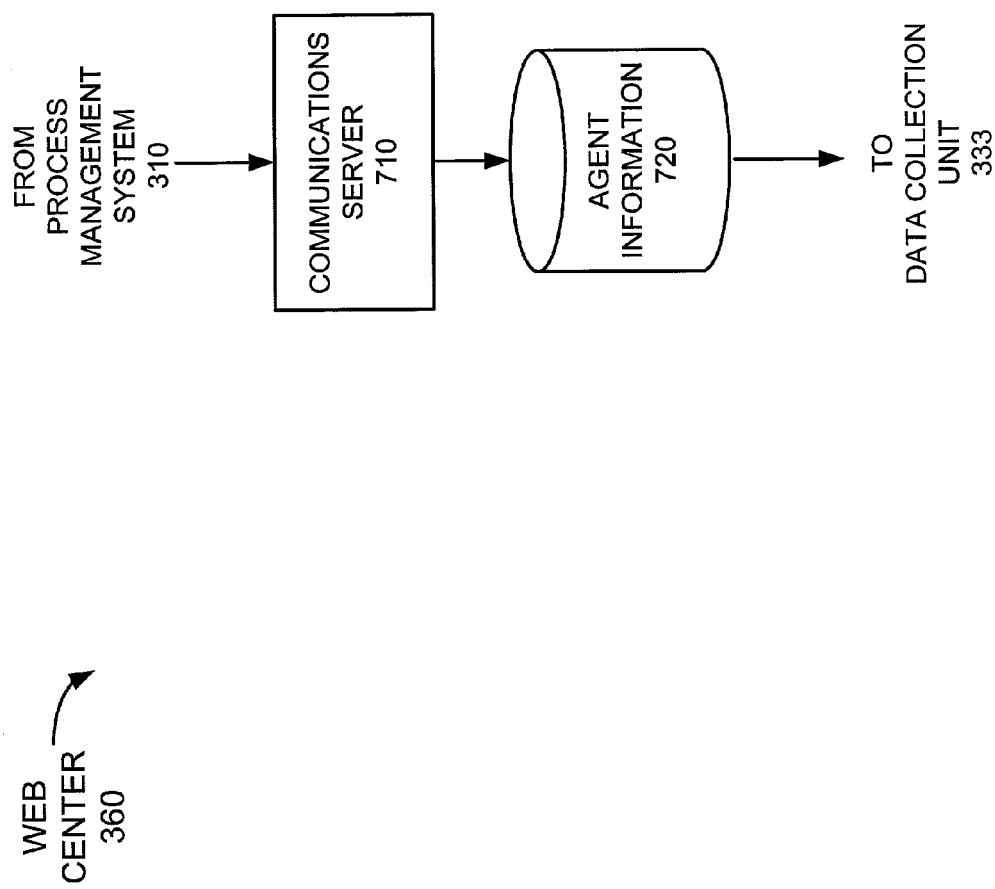
FIG. 7 illustrates an exemplary configuration of the web center of FIG. 3 in an implementation consistent with the present invention.

FIG. 7 illustrates an exemplary configuration of the web center 360 of FIG. 3 in an implementation consistent with the present invention. As illustrated, the web center 360 includes a communications server 710 and an agent information database 720. The communications server 710 queues, routes, and distributes communications from any first location to an appropriate agent at any second location. The communications server 710 may determine the appropriate agent based on data stored in the agent information database 720. The agent information database 720 may store agent activity information, the particular skills of the agents, and the like. Once a customer has utilized the services of the web center 360, the usage information may be transmitted to the data collection unit 333 and then to the billing and account management unit 334 for billing. Users may, via the network interface 320, provision new services, such as order a toll free number, and/or create new accounts at the web center 360.

Figure 8:
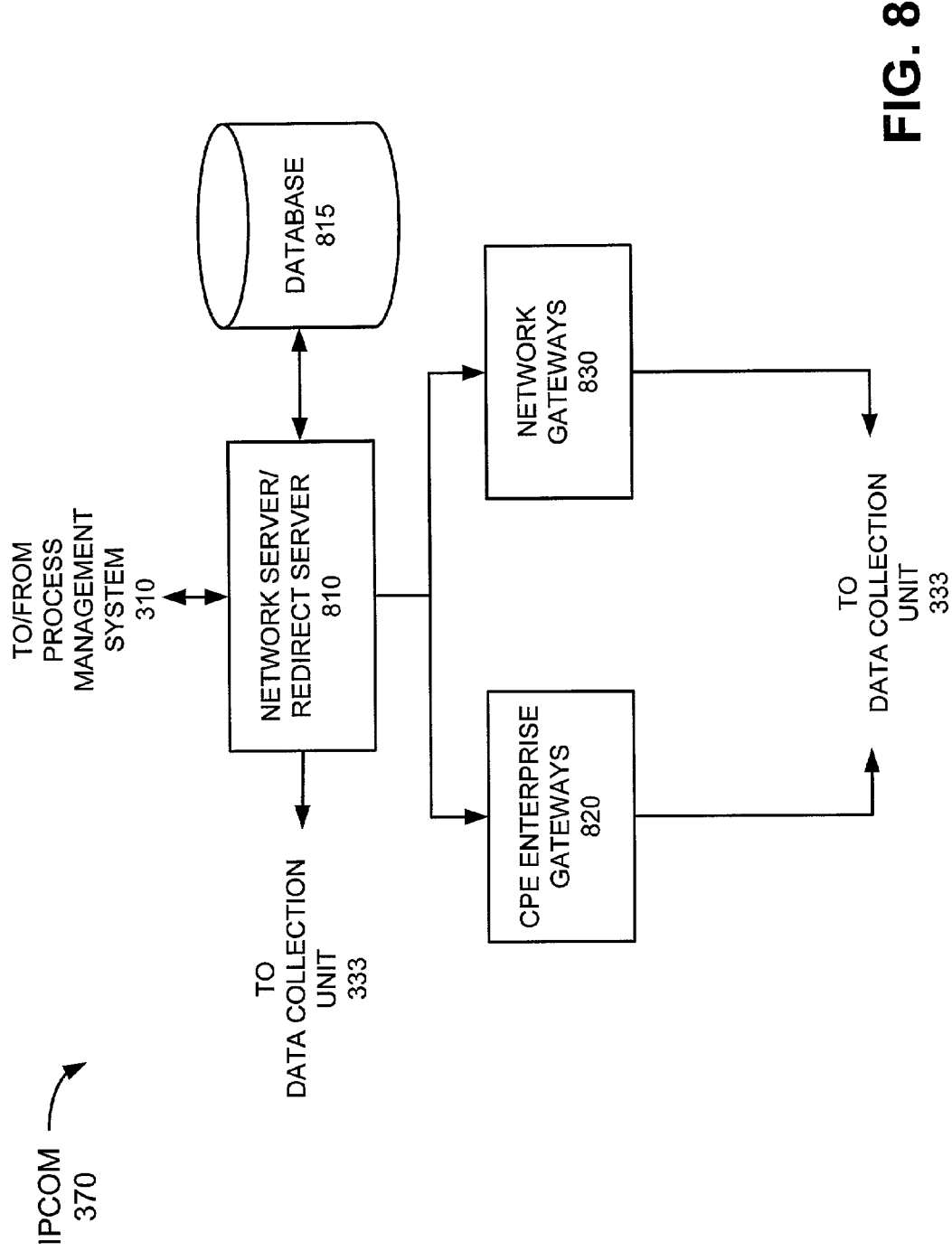
FIG. 8 illustrates an exemplary configuration of the Internet Protocol Communications (IPCOM) unit of FIG. 3 in an implementation consistent with the present invention.

FIG. 8 illustrates an exemplary configuration of the IPCOM unit 370 of FIG. 3 in an implementation consistent with the present invention. As illustrated, the IPCOM unit 370 includes a network server/redirect server 810, CPE enterprise gateways 820, and network gateways 830. The network server/redirect server 810 may include one or more servers that process calls made over the IP communications network based on data stored in an associated database 815. The database 815 may store data relating to call processing (e.g., information identifying the device by which the subscriber wishes to receive the call, network configuration information, etc.), subscriber profiles (e.g., subscriber identifiers), and network-supported features. The network server/redirect server 810 may direct calls to the appropriate gateway 820 or 830 based on this data. The network-supported features may include, for example, follow me, call blocking, call forwarding, voice mail, conference calling, single line extension, call screening, quality of service, class of service, dial-plan restrictions, dynamic registration, secondary directory number, and call transfer. As will be described in detail below, a subscriber may change attributes of these network-supported features and other network-related attributes using the network interface 320.

The CPE enterprise gateways 820 may include one or more gateways for linking customer systems to the IP communications network. The CPE enterprise gateways 820 may, for example, connect to a customer's PBX and convert time division multiplexed (TDM) voice data into VoIP packets and voice signaling into SIP messages. The network gateways 830 include one or more gateways for linking the IP communications network to the PSTN in a well-known manner. The CPE enterprise gateways 820 and network gateways 830 track customer access and transmit this customer access data to the data collection unit 333 for billing purposes.

Figure 9:
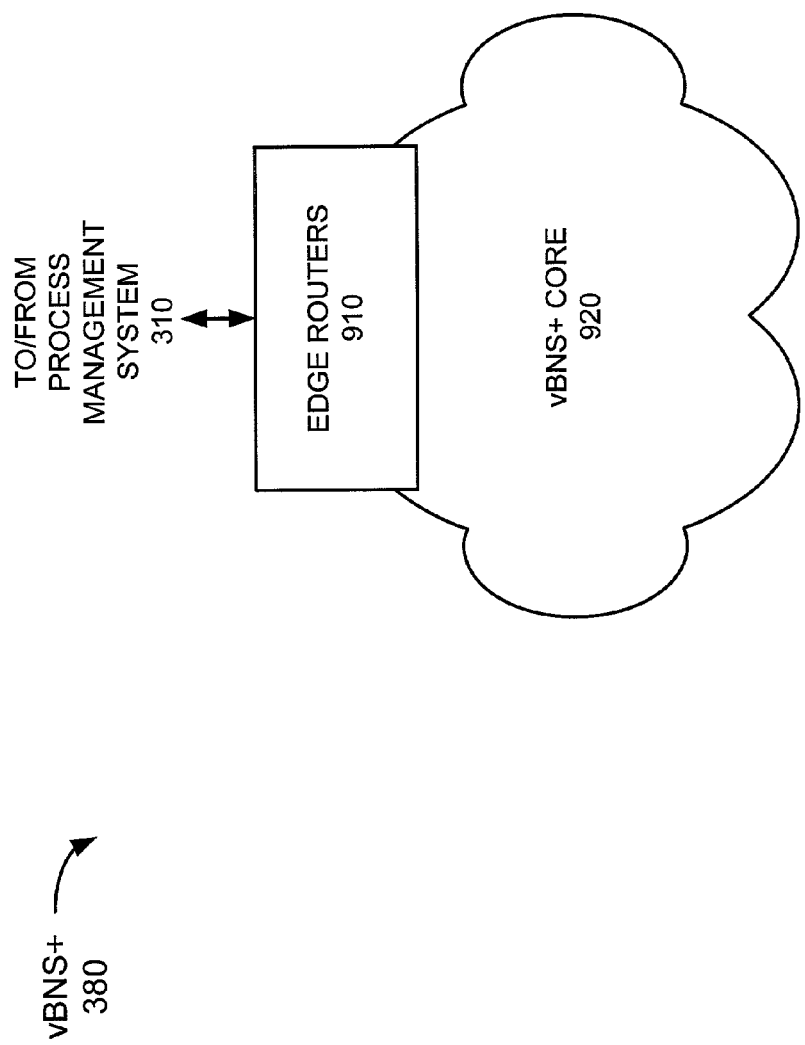
FIG. 9 illustrates an exemplary configuration of the very high performance backbone network service unit of FIG. 3 in an implementation consistent with the present invention.

FIG. 9 illustrates an exemplary configuration of the vBNS+ unit 380 of FIG. 3 in an implementation consistent with the present invention. As illustrated, the vBNS+ unit 380 includes a group of edge routers 910 that route packets to/from the vBNS+ core network 920. The edge routers 910 may connect to the network server/redirect server 810, network gateways 830, customer's CPE equipment, other routers in the IPCom network, directly to SIP telephones, etc. The edge routers 910 may be configured or updated via the network interface 320. The vBNS+ core 920 may include one or more core routers for routing packets between edge routers 910.

The foregoing description of the OSS 130 provides an overview of the configuration of the OSS 130. A more detailed description of the present invention is provided below.

Exemplary Processing

Some of the products and services supported by the OSS 130 enable various users (e.g., customers, engineers, accounting personnel, etc.) to submit modifications to attributes associated with services provided by the OSS 130. It is important that these changes be reflected in the billing and account management unit 334 to ensure that the customer is properly billed after any modifications have been made to the customer's account. The present invention is directed to systems and methods that ensure that modifications made to customer accounts are available in the billing and account management unit in substantially real time.

Figure 10:
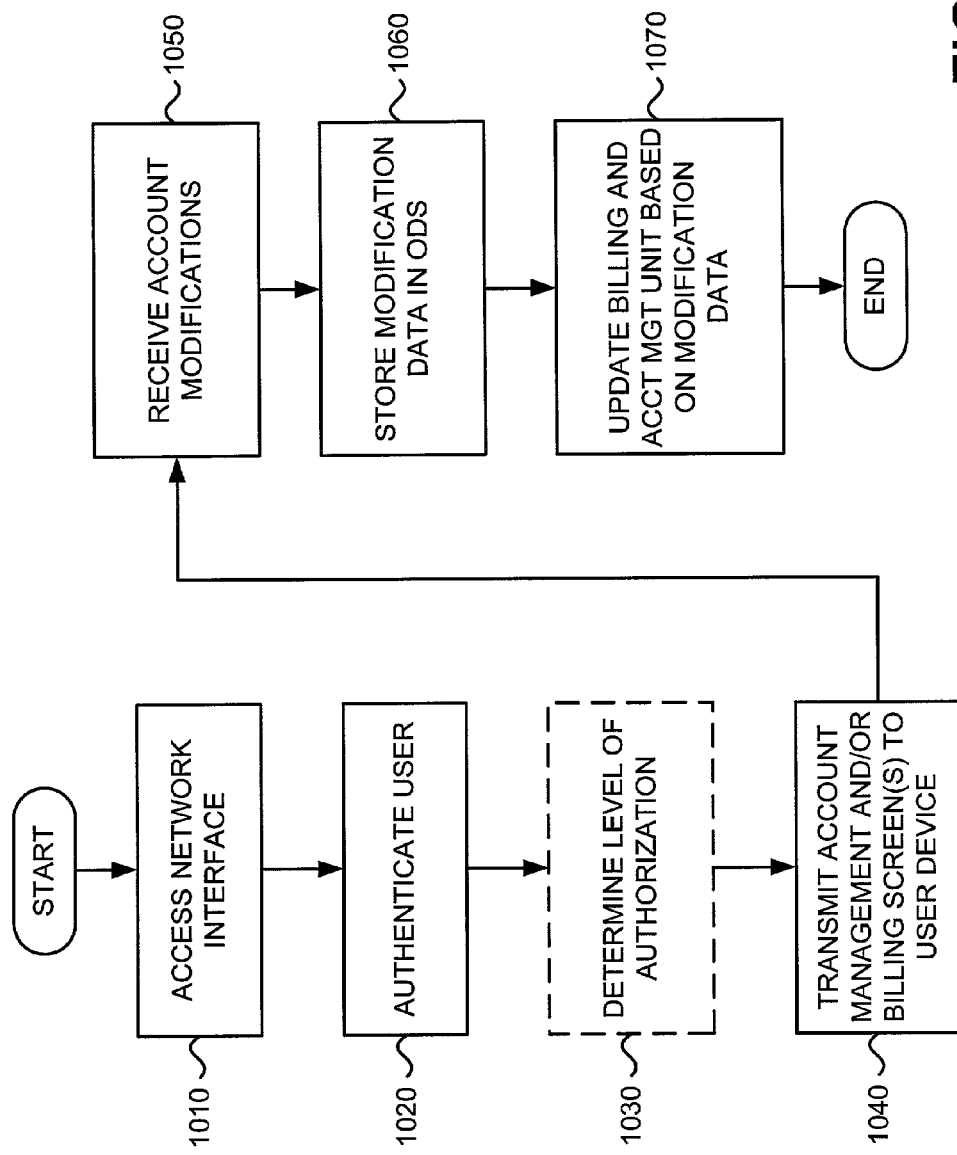
FIG. 10 illustrates an exemplary process for updating a billing and account management unit in an implementation consistent with the present invention.

FIG. 10 illustrates an exemplary process for updating billing and account management unit 334 in an implementation consistent with the present invention. Processing may begin with a user (e.g., a customer, an accounting person, etc.) establishing a connection with the network interface 320 [act 1010]. The user may, for example, accomplish this via any conventional Internet connection by entering a link or address, such as a uniform resource locator (URL), associated with the network interface 320. In alternative implementations, the user may establish a direct connection with the network interface 320. In each of these scenarios, the network interface 320 may then transmit a login screen to the user in order to authenticate the user [act 1020].

Figure 11:
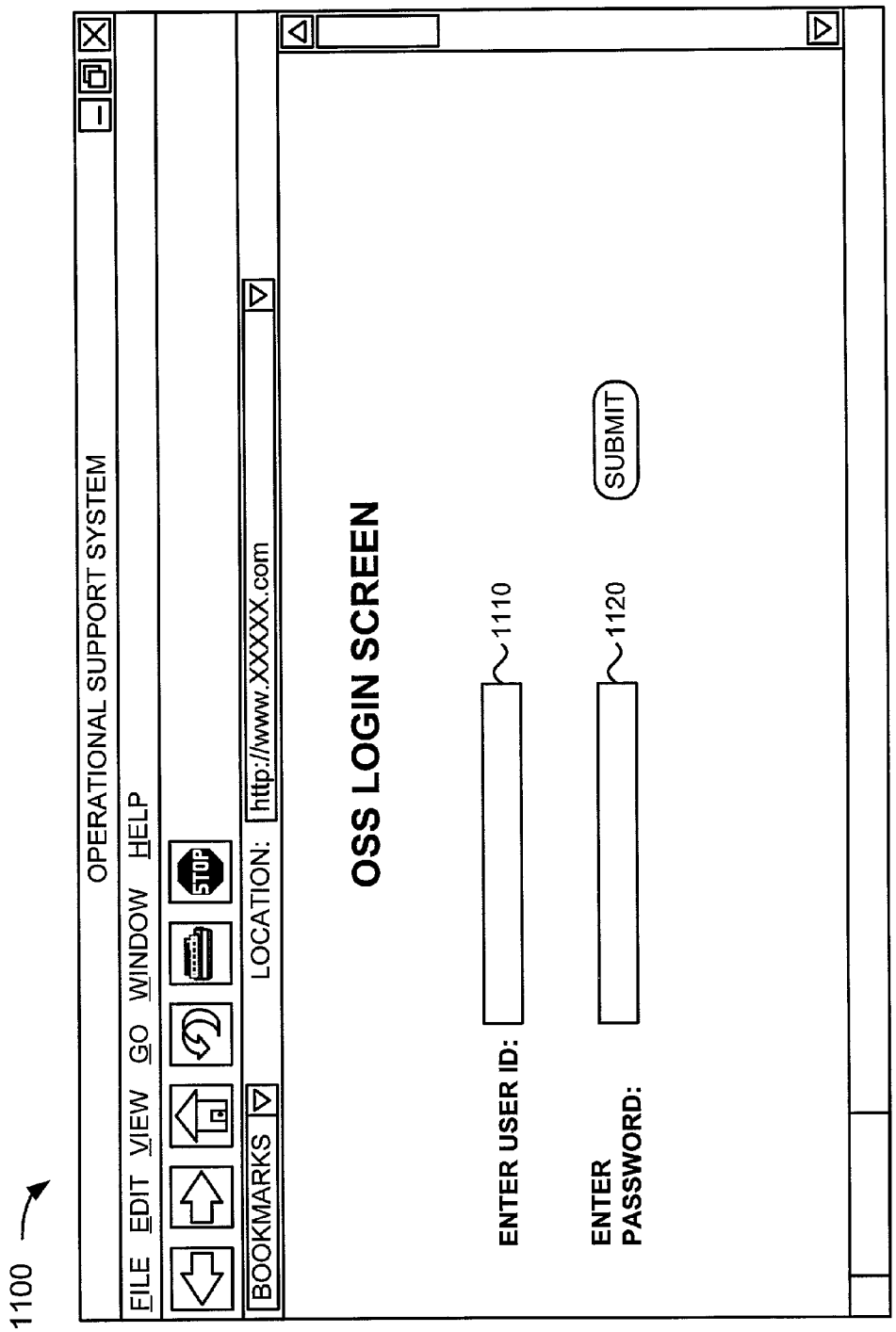
FIG. 11 illustrates an exemplary login screen consistent with the present invention.

FIG. 11 illustrates an exemplary login screen 1100 consistent with the present invention. As illustrated, the login screen 1100 prompts the user to enter an identifier (ID) 1110 and password 1120. The identifier may be, for example, an e-mail address or some other unique identifier associated with the user.

The user may enter an ID and password in a well-known manner via the user device 120. The user device 120 may then transmit the user ID and password to the network interface 320. The network interface 320 may authenticate the user by, for example, comparing the user's ID and password to authorized identifiers and passwords [act 1020].

Once authenticated, the network interface 320 may optionally determine the level of authorization with which the user is associated [act 1030]. The OSS 130 may, for example, grant engineers a higher level of authorization (i.e., permit access to a greater number of components of the OSS 130) than customers.

If authorized, the user may perform the following exemplary account management functions: create accounts, create sub-accounts for a master account (the billing and account management unit 334 allows an account to be structured in a hierarchical fashion so as to reflect a customer's organization), update account information, manage disconnects, manage cancellations, access account data, and access historical data (e.g., old invoices). The user may also perform the following billing functions: creating and/or modifying pricing plans for service installation, subscription-based features (e.g., follow me, call forwarding, call blocking, voice mail, conference calling, single line extension, call screening, quality of service, class of service, dial-plan restrictions, dynamic registration, secondary directory number, and call transfer), IP communication services (e.g., VoIP), etc.

Assume that the user wishes to perform some account management function, such as creating a new account, or some billing function, such as viewing a past invoice. The network interface 320 may transmit graphical user interface screen(s) to the user device 120 to allow the user to perform desired account management and/or billing functions [act 1040].

Figure 12:
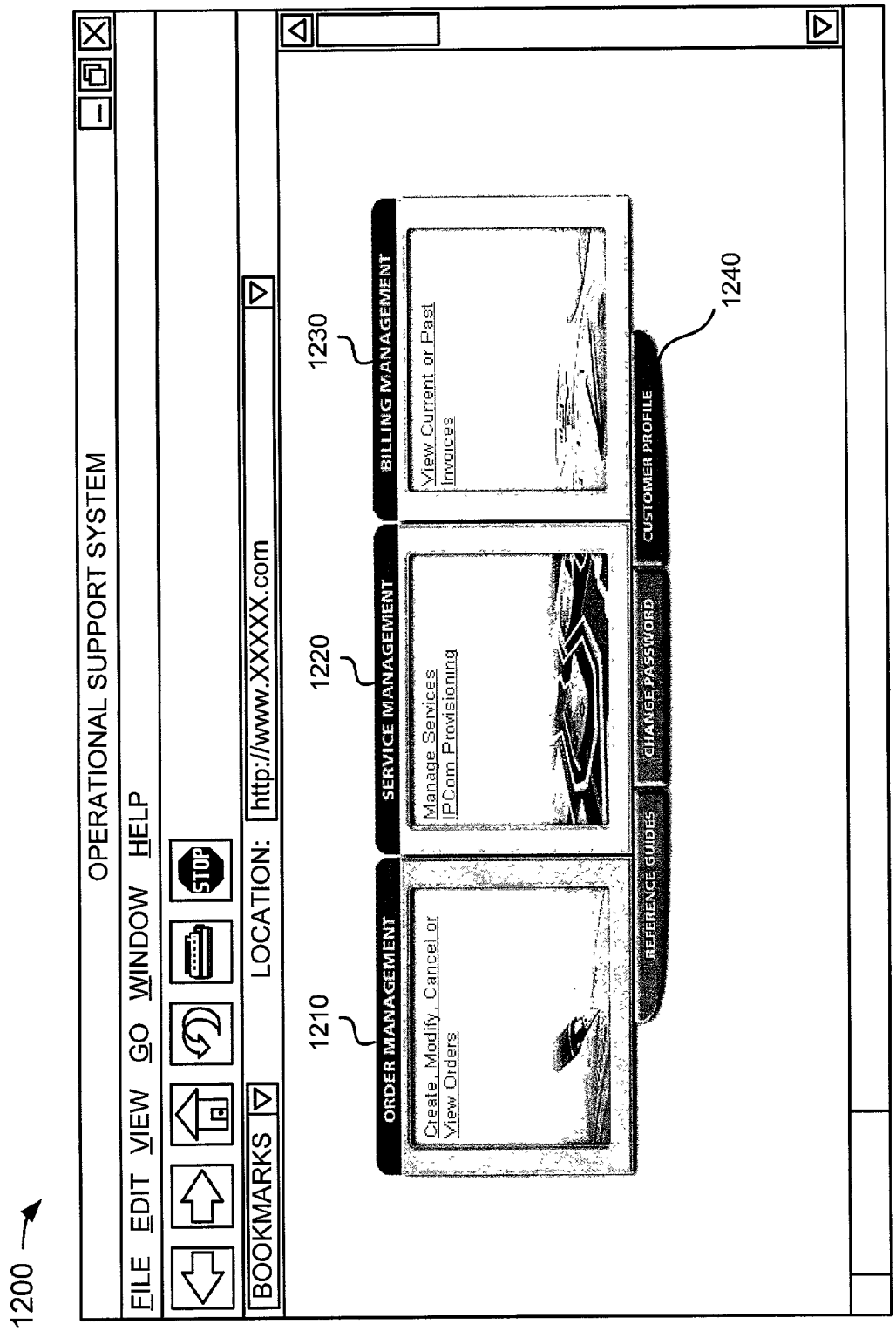

FIG. 12 illustrates an exemplary account management introductory screen 1200 that may be provided to the user by the network interface 320 in an implementation consistent with the present invention. As illustrated, the account management introductory screen 1200 allows the user to select from the following exemplary categories: Order Management 1210, Service Management 1220, and Billing Management 1230. The user may also select a button to obtain reference information, to change his/her password, or to create a new master customer account or sub-account. Via the Order Management category 1210, the user may create, modify, cancel, or view orders. Via the Service Management category 1220, the user may manage services and provision IP communication services. Via the Billing Management category 1230, the user may view current or past invoices.

Upon selecting one of the categories 1210-1230 or buttons, such as customer profile button 1240, the network interface 320 provides the user with one or more screens for performing the desired function(s). Initially, it is assumed that the user desires to create a new master customer account. To do so, the user may select the customer profile button 1240. FIGS. 13-15 illustrate exemplary screens that may be provided to a user by the network interface 320 in response to the user selecting the customer profile button 1240 in the account management introductory screen 1200.

FIG. 13 illustrates an exemplary account creation screen 1300 that can be provided to the user by the network interface 320 in an implementation consistent with the present invention. As illustrated, the account creation screen 1300 allows the user to create a new master customer account 1310 or to create a new sub-account for an existing master account 1320. To create a new master customer account, the user may enter the name of the new master account and then select the create new master account button 1330. In response, the network interface 320 may provide the user with the screen 1400 illustrated in FIGS. 14A and 14B.

Figure 14B:
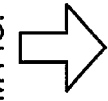

In the screen 1400 illustrated in FIGS. 14A and 14B, the user may enter the new customer account information (e.g., account name, contact name, title, address, e-mail address, telephone number(s), fax number, customer abbreviation, customer type, etc.), customer billing information (e.g., billing contact person, address, and credit limit amount), and account information (e.g., a sales representative identifier). The fields shown in FIGS. 14A and 14B are provided by way of example only. A typical account creation screen 1400 may include other fields (not shown) that aid in identifying and/or billing customers. Once the information has been entered into the fields of screen 1400, the user may accept the information by selecting the confirm button 1410.

Assume now that the user wishes to create one or more sub-accounts for this new master account. The user may select the customer profile button 1240 in account management introductory screen 1200 of FIG. 12. The user may be provided with the account creation screen 1300 as illustrated in FIG. 15. In this scenario, the user may select the desired customer master account 1510 and then select the account to which the new sub-account will be added 1520. The user may then select the create button 1530 to create the new sub-account.

Figure 16B:
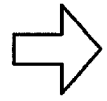

FIGS. 16A and 16B illustrate an exemplary sub-account creation screen 1600 that may be provided to the user in an implementation consistent with the present invention. As illustrated, the sub-account creation screen 1600 is similar to the account creation screen 1400. The sub-account creation screen 1600 includes the added ability to allow the master account to be billed for charges incurred by the sub-account as indicated by input 1610. Once the user has entered the appropriate information into the fields of the sub-account creation screen 1600, the user may accept the information by selecting the confirm button 1620.

Figure 17:
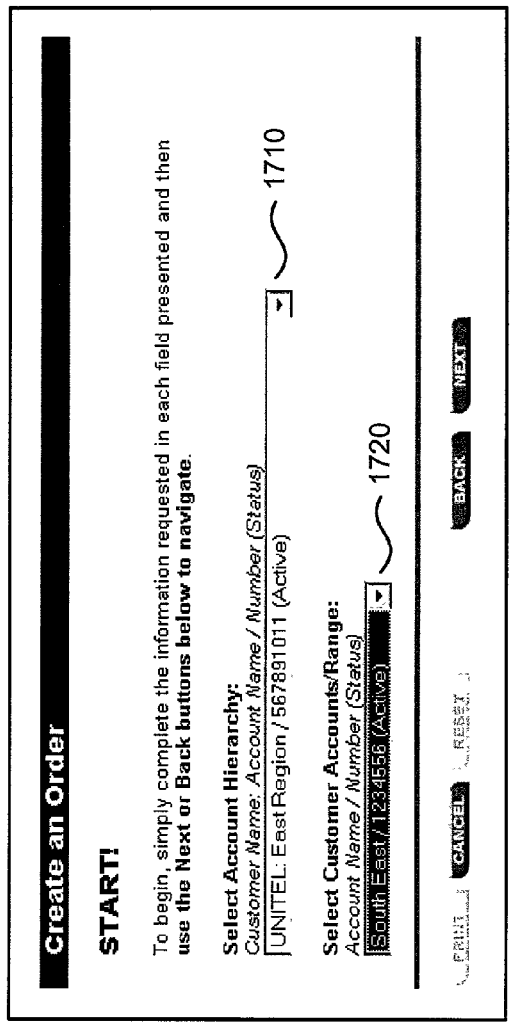
Figure 18:
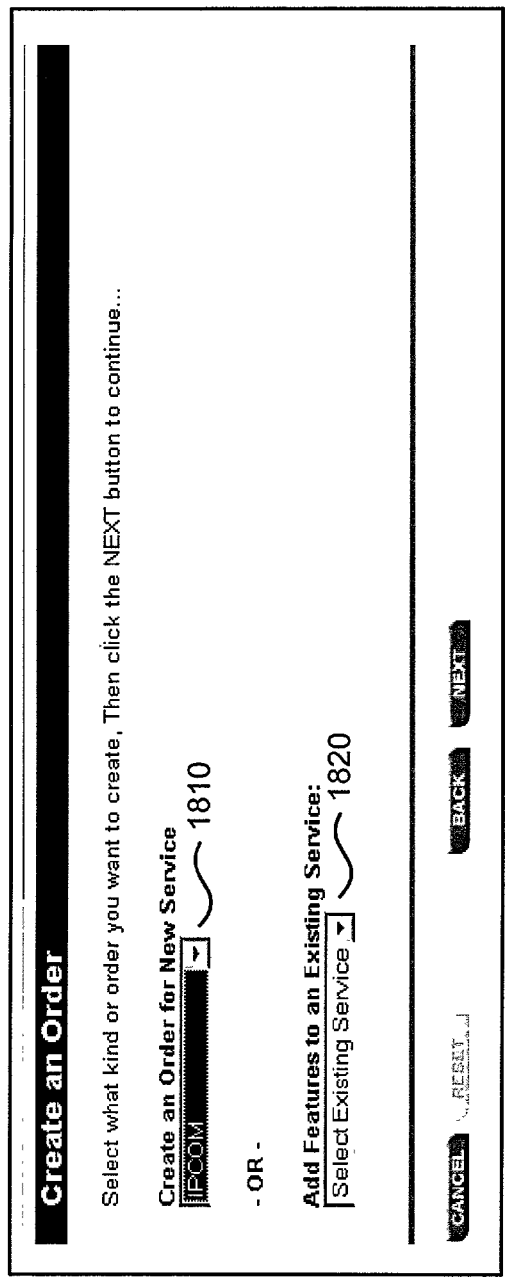

Returning to FIG. 12, assume that the user wishes to create a new order (e.g., for an IP communications service) for a customer. The user may select the Order Management category 1210. FIGS. 17-19 illustrate exemplary screens that may be provided to the user in an implementation consistent with the present invention.

Upon selection of the Order Management category 1210, the user may be provided with the screen 1700 illustrated in FIG. 17. Here, the user may select the customer 1710 and account 1720 relating to the particular customer for which the order is being created. As illustrated in FIG. 17, the user has selected the South East Region of the customer UNITEL.

Upon selection of the appropriate customer and account, the user may be requested to enter a new service to be ordered 1810 or to add features (e.g., call forwarding, call screening, call blocking, voice mail, etc.) to an existing service 1820, as illustrated in the exemplary screen 1800 of FIG. 18. Assume that the customer desires to add IP communication services. The user may select "IPCOM" from the pull-down menu 1810.

FIG. 19 illustrates an exemplary screen 1900 that may be provided to the user for creating an IPCOM order in an implementation consistent with the present invention. As illustrated, the user is requested to enter service information (e.g., a service location and a service name), contact information (e.g., contact name, address, e-mail address, and telephone number), account team information (e.g., account team name, telephone number, and e-mail address), and feature information (e.g., feature type and feature name). Once the user has entered the appropriate information, the user can complete the order by selecting the next button 1910.

Figure 21:
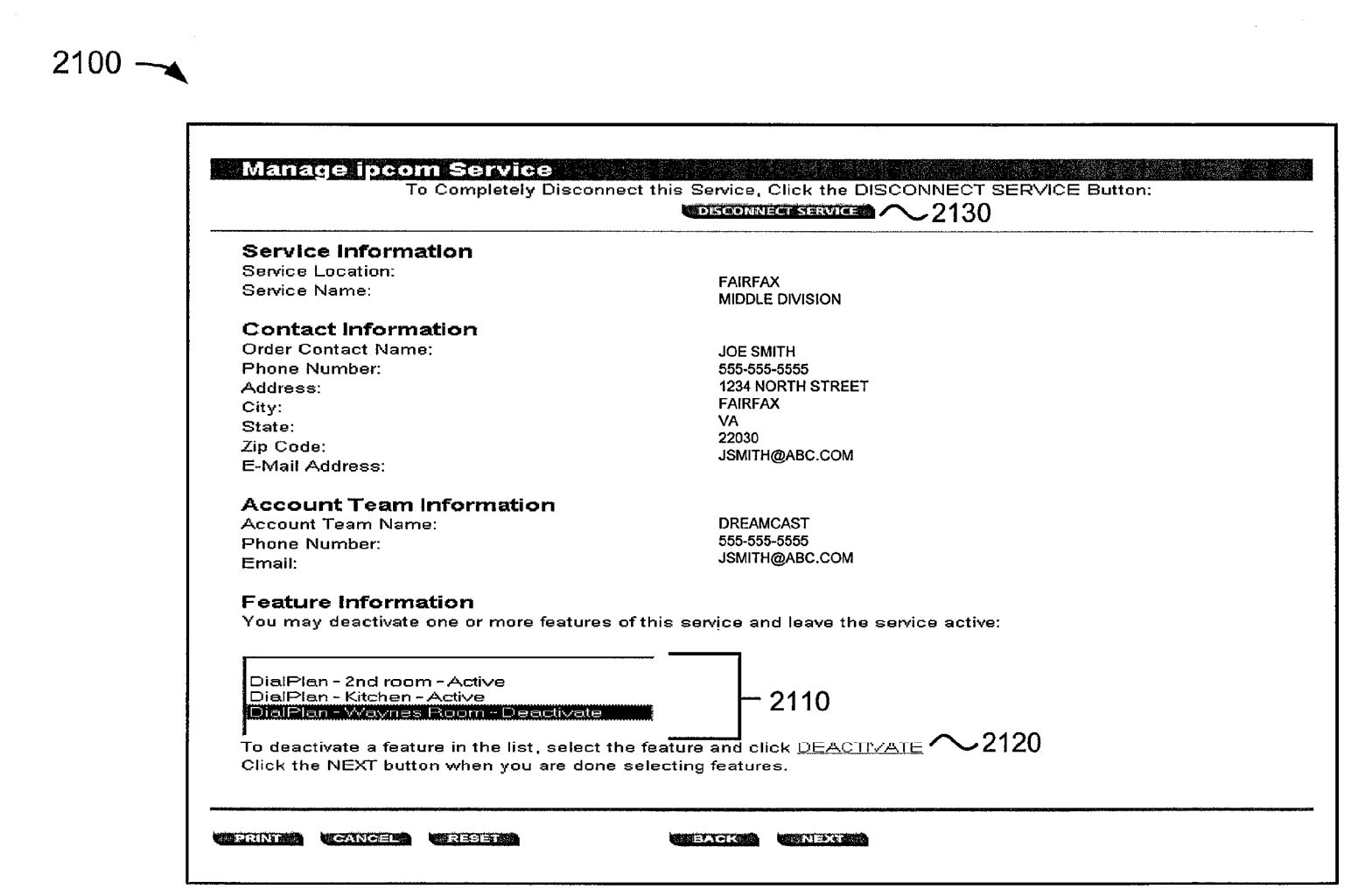

Returning to FIG. 12, assume that the user wishes to manage a particular service by, for example, deactivating a feature or disconnecting the service. The user may select the Manage Services link in the Service Management category 1220. FIGS. 20 and 21 illustrate exemplary screens that may be provided to the user in an implementation consistent with the present invention.

Upon selection of the Manage Services link in the account management introductory screen 1200, the user may be provided with the exemplary screen 2000 illustrated in FIG. 20. As illustrated, the user may be requested to select the account for which service is to be managed. The user may select the desired customer via the pull-down menu 2010, an account associated with that customer via the pull-down menu 2020, and a service/location via pull-down menu 2030. In the exemplary screen 2000 illustrated in FIG. 20, the user has selected the customer ABC, the East Coast account, and IP communications service at ABC's Fairfax location.

FIG. 21 illustrates an exemplary screen 2100 for managing the IP communications service selected in FIG. 20. Via this screen 2100, the user may deactivate an existing IP communications feature, such as private call routing, prefix plan processing, location processing, call blocking, feature blocking, gateway processing, and dial plan processing, or disconnect IP communications service all together. The screen 2100 provides an exemplary list of active features 2110 (i.e., DialPlan $2^{nd}$ room, DialPlan Kitchen, and DialPlan Waynes Room). To deactivate one of these features, the user may select the particular feature to be deactivated from the list 2110, and select the deactivate button 2120. The other features will remain active. If, on the other hand, the user wishes to disconnect service all together, the user may select the disconnect service button 2130.

Returning to FIG. 12, assume that the user wishes to view current or past invoices relating to his/her telecommunication service. The user may select the Billing Management category 1230. FIGS. 22-27 illustrate exemplary screens that may be provided to the user in an implementation consistent with the present invention.

Figure 22:
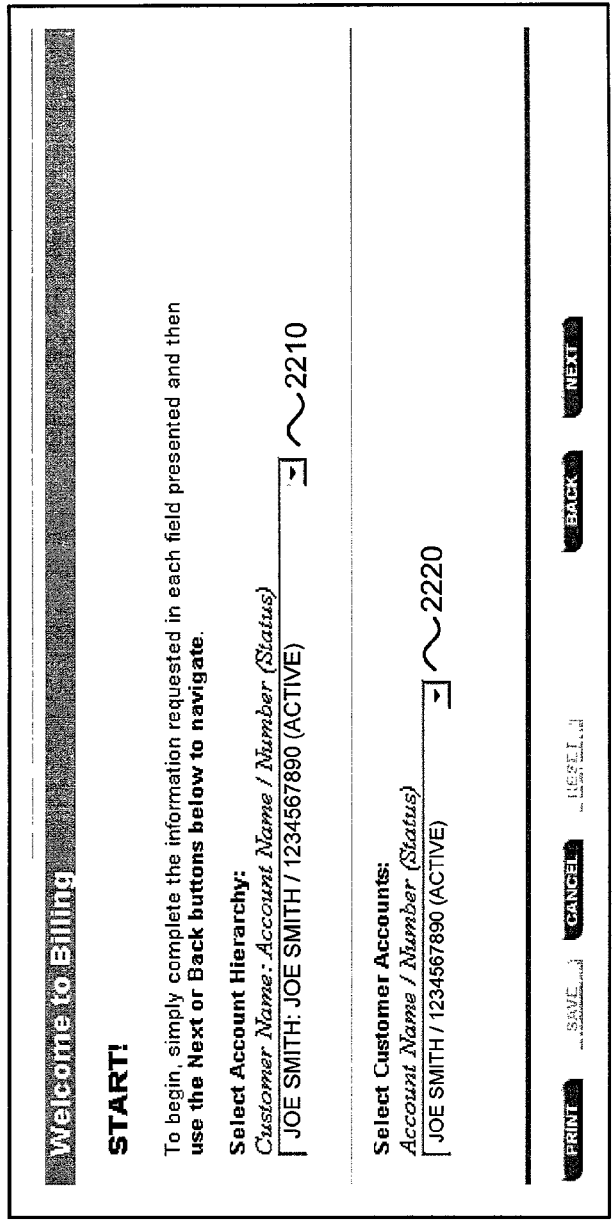
Figure 25:
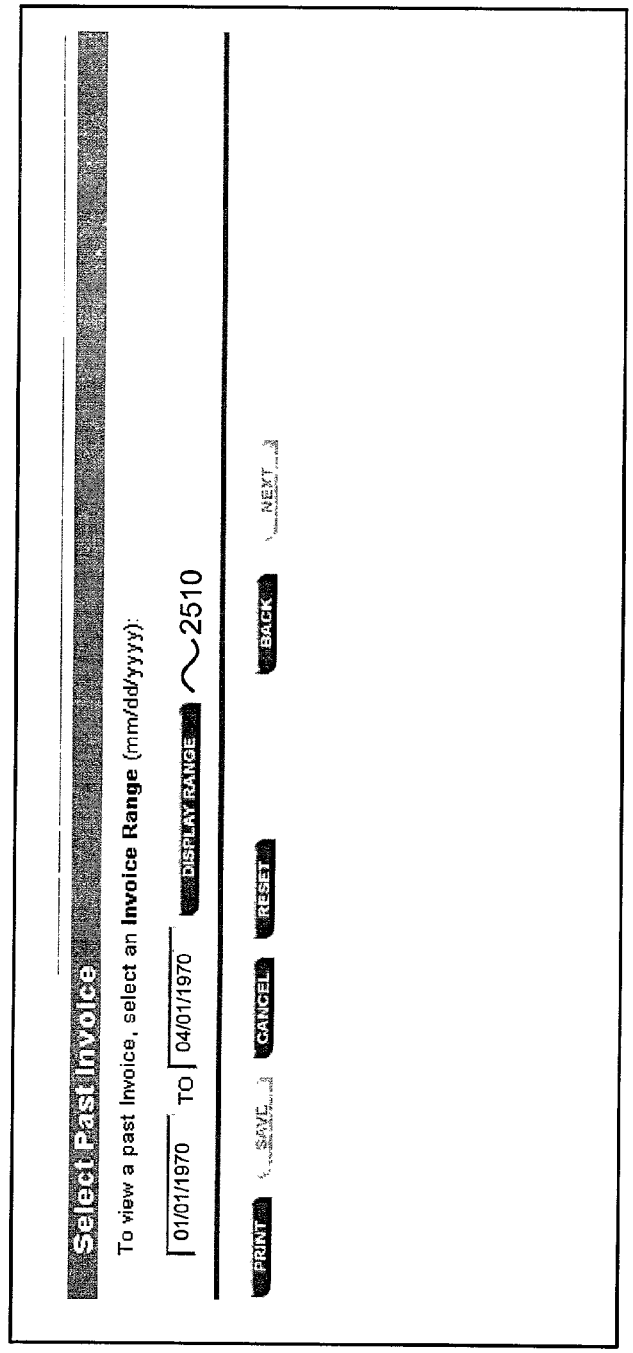

Upon selection of the Billing Management category 1230 in the account management introductory screen 1200, the user may be provided with the exemplary screen 2200 illustrated in FIG. 22. As illustrated, the user may be requested to select the particular account for which an invoice is desired. The user may select the customer via the pull-down menu 2210 and an account associated with that customer via the pull-down menu 2220. In the exemplary screen 2200 illustrated in FIG. 22, the user has selected the customer account Joe Smith.

The user may then be presented with the exemplary view current charges screen 2300 illustrated in FIG. 23. Via this screen 2300, the user may select to view current charges 2310 or a past invoice 2320. To view current charges, the user may select the long distance session charges link 2330. The user may then be provided with the exemplary screen 2400 illustrated in FIG. 24. Via this screen 2400, the user may view a list of current charges 2410. In this example, the user is presented with a list of current long distance charges. The list 2410 may include the following exemplary information: date and time, to what number the call was placed, the duration of the call, the charge per minute rate, and the total charge for each call.

If, on the other hand, the user wishes to view a past invoice, the user may select the select past invoice link 2320 in the screen 2300 illustrated in FIG. 23. In response, the user may be presented with the exemplary screen 2500 illustrated in FIG. 25. Via this screen 2500, the user may view a past invoice by entering an invoice date range 2510. Once a date range has been entered, the user may be presented with an exemplary screen 2600 (FIG. 26) that provides a list of past invoices that fall within the entered date range. Only one invoice is provided for simplicity. By selecting the desired invoice, the user may be presented with the exemplary screen 2700 illustrated in FIG. 27. Via this screen 2700, the user may view a summary 2710 of the desired past invoice.

The screens illustrated in FIGS. 12-27 have been provided by way of example. It will be appreciated that the network interface 320 may provide the user with similar (or different) screens for performing account management and billing functions.

Returning to FIG. 10, the network interface 320 receives any modifications (e.g., additions, cancellations, and/or updates) made by the user [act 1050] and transmits this data to the process management system 310. The process management system 310 transmits the new data to the warehouse and the ODS of database 331. The ODS may validate, process, and store the data [act 1060] and forward a copy of the data to the billing and account management unit 334, via the process management system 310, for storage [act 1070]. In this way, the billing and account management unit 334 contains the most recent customer data for performing billing and account management functions. Additional details regarding the transfer of data to the billing and account management unit 334 via process management system 310 can be found in copending, commonly assigned, U.S. patent application Ser. No. 10/097,866, filed Mar. 15, 2002, the entire contents of which are expressly incorporated by reference herein.

The billing and account management unit 334 may thereafter generate one or more bills for a customer or perform one or more account management services using this data. In this manner, changes made by a user to services provided by the OSS 130 are reflected in the billing and account management unit 334 in substantially real time.

CONCLUSION

Implementations consistent with the present invention provide an operational support system that allows users to add, cancel, and/or modify services offered by the operational support system, such as VoIP services, via a web-based interface. The operational support system updates the billing and account management unit in substantially real time based on changes made by the users to ensure accurate billing and that services performed by the operational support system reflect these updates.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, it will be appreciated that the present invention can be implemented in hardware, software, or a combination of hardware and software. Thus, the present invention is not limited to any specific combination of hardware circuitry and software.

Moreover, while a series of acts has been described with respect to FIG. 10, the order of the acts may vary in other implementations consistent with the present invention. In addition, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method comprising:
    providing, via a server, a management interface to a user, the management interface including:
    an order management option,
    a service management option, a billing management option, and
    a customer profile option,
        the order management option allowing the user to create, modify, cancel, and view orders,
        the service management option allowing the user to manage services and provision Internet Protocol (IP) communication services,
        the billing management option allowing the user to view current charges and past invoices for a date range entered by the user, and
        the customer profile option allowing the user to create an account and a sub-account;
    receiving, via the server, at least one modification to an IP communications network account from the user via one of the order management option, the service management option, the billing option, or the customer profile option;
    modifying, via the server, a first record in a database based on the received at least one modification;
    transmitting, via the server, the at least one modification from the database to a billing unit; and
    updating and storing, via the server, a second record, corresponding to the first record, in the billing unit based on the at least one modification, the updated second record being available in real time.

2. The method of claim 1 further comprising:
    generating, via the server, at least one bill using the updated second record.

3. The method of claim 1 where the at least one modification includes creating a new account.

4. The method of claim 1 where the at least one modification includes creating a new sub-account.

5. The method of claim 1 where the at least one modification includes one of adding, deleting, or updating an order for an IP communications network service to the IP communications network account.

6. The method of claim 5 where the IP communications network service includes voice over IP service.

7. The method of claim 1 where the at least one modification includes updating one or more of private call routing, prefix plan management, location management, call blocking management, feature blocking management, gateway management, or dial plan management.

8. The method of claim 1 where the database is an operational data store.

9. The method of claim 1 where the receiving includes:
receiving the at least one modification via a web-based interface.

10. A system comprising:
a network interface including:
an order management option,
a service management option,
a billing management option, and
a customer profile option,
the order management option allowing a user to create, modify, cancel, and view orders,
the service management option allowing the user to manage services and provision Internet Protocol (IP) communication services,
the billing management option allowing the user to view charges and past invoices for a date range entered by the user, and
the customer profile option allowing the user to create an account and a sub-account,
the network interface to:
receive, via one of the order management option, the service management option, the billing management option, or the customer profile option, at least one modification to an IP communications network account from the user via a data network, and
forward the at least one modification;
an operational data store to:
receive the at least one modification from the network interface,
store the at least one modification, and
forward the at least one modification; and
a billing and account management unit, associated with the IP communications network account, and to:
receive the at least one modification from the operational data store,
store the at least one modification, the at least one modification being available in real time, and
perform at least one of account management or billing based on the at least one modification.

11. The system of claim 10 further comprising:
a process management system to:
route the at least one modification from the network interface to the operational data store, and
route the at least one modification from the operational data store to the billing and account management unit.

12. The system of claim 10 where the data network includes an Internet.

13. The system of claim 12 where the network interface includes a web-based interface.

14. The system of claim 10 where the at least one modification includes information associated with creating a new account.

15. The system of claim 10 where the at least one modification includes information associated with creating a new sub-account.

16. The system of claim 10 where the at least one modification includes one of adding, deleting, or updating an order for an IP communications network service to the IP communications network account.

17. The system of claim 16 where the IP communications network service includes voice over IP service.

18. The system of claim 10 where the at least one modification includes information associated with updating one or more of private call routing, prefix plan management, location management, call blocking management, feature blocking management, gateway management, or dial plan management services.

19. The system of claim 10 where the billing and account management unit is configured to allow the user to view current and past invoices related to the IP communications network account.

20. A method comprising:
providing, via a server, a web-based interface to a user, the web-based interface including:
an order management option,
a service management option,
a billing management option, and
a customer profile option,
the order management option allowing the user to create, modify, cancel, and view orders,
the service management option allowing the user to manage services and provision Internet Protocol (IP) communication services,
the billing management option allowing the user to view charges and past invoices for a date range entered by the user, and
the customer profile option allowing the user to create an account and a sub-account;
receiving, via the server and via one of the order management option, the service management option, the billing option, or the customer profile option, a modification to the at least one account from the user;
updating, via the server, a first record associated with the at least one account in an operational data store based on the received modification;
transferring, via the server, the modification from the operational data store to an account management and billing unit associated with the IP communications network;
modifying, via the server, a second record associated with the at least one account at the account management and billing unit, the modification to the second record being implemented in real time; and
performing, via the server, one of an account management function or a billing function using the modified second record.

21. The method of claim 20 where the modification includes information associated with creating a master account.

22. The method of claim 20 where the modification includes information associated with creating the sub-account.

23. The method of claim 20 where the modification includes one of adding, deleting, or updating an order for an IP communications network service to the at least one account.

24. The method of claim 23 where the IP communications network service includes voice over IP service.

25. The method of claim 20 where the modification includes information associated with updating one or more of private call routing, prefix plan management, location management, call blocking management, feature blocking management, gateway management, or dial plan management.

26. A system for updating a billing unit, comprising:
means for providing a management interface to a user, the management interface including:
an order management option,
a service management option,
a billing management option, and
a customer profile option,
the order management option allowing the user to create, modify, cancel, and view orders,
the service management option allowing the user to manage services and provision Internet Protocol (IP) communication services,
the billing management option allowing the user to view charges and past invoices for a date range entered by the user, and
the customer profile option allowing the user to create an account and a sub-account;
means for receiving at least one modification to a communications network account from a user via one of the order management option, the service management option, the billing option, or the customer profile option;
means for modifying a first record in a database based on the received at least one modification;
means for transmitting the at least one modification from the database to the billing unit; and
means for updating a second record, corresponding to the first record, in the billing unit based on the at least one modification, the updated second record being available in real time.

27. The system of claim 26 further comprising:
means for generating at least one bill using the updated second record.

28. The system of claim 26 where the at least one modification includes one of adding, deleting, or updating an order for a communications network service to the communications network account.

29. The system of claim 26 where the database includes an operational data store.

30. The system of claim 26 further comprising:
means for providing a current invoice to the user based on the at least one modification.

* * * * *